(12) United States Patent
Park (10) Patent No.: US 10,432,828 B2
(45) Date of Patent: Oct. 1, 2019

(54) CAMERA MODULE HAVING A SHIELD MEMBER

(71) Applicant: LG INNOTEK CO., LTD., Seoul (KR)

(72) Inventor: Yong Tae Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/748,477

(22) PCT Filed: Jul. 28, 2016

(86) PCT No.: PCT/KR2016/008271
§ 371 (c)(1),
(2) Date: Jan. 29, 2018

(87) PCT Pub. No.: WO2017/018821
PCT Pub. Date: Feb. 2, 2017

(65) Prior Publication Data
US 2018/0227466 A1 Aug. 9, 2018

(30) Foreign Application Priority Data

Jul. 29, 2015 (KR) .................. 10-2015-0106970

(51) Int. Cl.
*H04N 5/225* (2006.01)
*H04N 7/18* (2006.01)
(Continued)

(52) U.S. Cl.
CPC ......... *H04N 5/2252* (2013.01); *H04N 5/2253* (2013.01); *H04N 5/3577* (2013.01);
(Continued)

(58) Field of Classification Search
CPC .... H04N 5/2252; H04N 5/3577; H04N 5/225; H04N 7/18; H05F 3/02
See application file for complete search history.

(56) References Cited

U.S. PATENT DOCUMENTS

| 2009/0033790 A1* | 2/2009 | Lin ................... G02B 7/023 348/374 |
| 2011/0096524 A1 | 4/2011 | Kameyama |
| 2011/0199485 A1 | 8/2011 | Nakamura |

FOREIGN PATENT DOCUMENTS

| KR | 10-2009-0128852 A | 12/2009 |
| KR | 10-2012-0003036 A | 1/2012 |

(Continued)

OTHER PUBLICATIONS

KR 101444024 English Translation (Year: 2014).*
International Search Report in International Application No. PCT/KR2016/008271, filed Jul. 28, 2016.

*Primary Examiner* — Twyler L Haskins
*Assistant Examiner* — Angel L Garces-Rivera
(74) *Attorney, Agent, or Firm* — Saliwanchik, Lloyd & Eisenschenk (57) ABSTRACT

A camera module in one embodiment may comprise: a lens unit; a first casing to which the lens unit is coupled; a printed circuit board which is disposed on the rear side of the lens unit so as to be spaced from the lens unit, and is disposed in the direction of the optical axis of the lens unit so as to face the lens unit; a second casing which is disposed on the rear side of the first casing and accommodates the printed circuit board, and of which the front portion is coupled to the rear portion of the first casing; and a shield member which is electrically connected to the lens unit and is grounded to the second casing.

20 Claims, 7 Drawing Sheets

(51) Int. Cl.
*H04N 5/357* (2011.01)
*H05F 3/02* (2006.01)
*G08B 13/196* (2006.01)

(52) U.S. Cl.
CPC ............... *H04N 7/18* (2013.01); *H04N 7/183* (2013.01); *H05F 3/02* (2013.01); *G08B 13/19619* (2013.01)

(56) References Cited

FOREIGN PATENT DOCUMENTS

KR  10-2013-0127780 A   11/2013
KR      101444024 B1 *  9/2014

* cited by examiner

CAMERA MODULE HAVING A SHIELD MEMBER

CROSS-REFERENCE TO RELATED APPLICATIONS

This application is the U.S. national stage application of International Patent Application No. PCT/KR2016/008271, filed Jul. 28, 2016, which claims priority to Korean Application No. 10-2015-0106970, filed Jul. 29, 2015, the disclosures of each of which are incorporated herein by reference in their entirety.

TECHNICAL FIELD

Embodiments relate to a camera module that has a structure for preventing static electricity from flowing to an electrically conductive component provided inside the camera module.

BACKGROUND ART

The content described in this section merely provides background information regarding embodiments, and does not constitute the prior art.

Camera modules may be used for closed-circuit televisions (CCTVs), automobiles, etc. These days, CCTVs are connected to online services so that images captured by the CCTVs can be viewed remotely. Further, the quality of images captured by CCTVs is steadily improving.

Camera modules having various use purposes may be mounted to automobiles. For example, a camera module that can capture a rear view when parking an automobile may be mounted to the back of an automobile.

In addition, recently, a camera module has come to be used in an automobile black box, which is very useful to investigate, for example, the details and possible cause of a traffic accident. In addition, the case where a camera module is used as a recognition device to clearly and easily recognize the situation in blind spots, which an automobile driver or passenger has difficulty checking visually, is gradually increasing.

In recent years, the manufacture of a so-called smart car, i.e. an automobile equipped with, for example, a collision warning system, which anticipates the potential of front and rear collisions while the automobile is moving so as to prevent the collisions, and a collision avoidance system, in which a control device mounted in the automobile can directly avoid a collision between traveling automobiles without relying on a driver, is increasing, and the development of associated technologies is increasing.

The use of a camera module that serves to recognize the state outside the smart car is increasing and, correspondingly, the production and technical development of a camera module for use in an automobile are increasing.

In order to improve the quality of an image captured by a camera module for use in a CCTV, an automobile or the like, it is important for the camera module, which is the dominant factor in determining image quality, to maintain its intrinsic performance regardless of external influences.

However, a portion of a camera module for use in a CCTV, an automobile or the like may be exposed to the outside. Therefore, dust particles or the like around the camera module may generate static electricity at the camera module by electrostatic discharge (ESD).

In the case in which static electricity generated at the camera module flows to a component provided inside the camera module, particularly, to an electrically conductive component, performance degradation or breakdown of the component may occur, which may result in performance degradation or breakdown of the camera. Therefore, an improvement is required.

DISCLOSURE

Technical Problem

Therefore, embodiments relate to a camera module that has a structure for preventing static electricity from flowing to an electrically conductive component provided inside the camera module.

The objects of the embodiments should not be limited to the aforementioned objects, and other unmentioned objects will be clearly understood by those skilled in the art from the following description.

Technical Solution

In one embodiment, a camera module includes a lens unit, a first casing coupled with the lens unit, a printed circuit board disposed behind the lens unit so as to be spaced apart from the lens unit and to face the lens unit in an optical-axis direction of the lens unit, a second casing disposed behind the first casing and coupled at a front portion thereof to a rear portion of the first casing, the second casing being configured to accommodate the printed circuit board therein, and a shield member electrically connected to the lens unit and grounded to the second casing.

The lens unit may include a barrel including a hollow region formed therein to allow incident light to pass therethrough and inserted at a rear portion thereof into a hollow region formed in the first casing, and at least one lens mounted to the barrel.

The barrel may be formed of a metal material, and the shield member may be electrically connected to the barrel.

The shield member may be formed of a metal material, and may include a hollow region formed therein, a first terminal protruding in a central direction of the hollow region so as to be brought into contact with the barrel and configured to electrically connect the barrel and the shield member to each other, and a second terminal configured to be bent and extend from the shield member so as to be brought into contact with the second casing and to allow the shield member to be grounded to the second casing.

The camera module may further include at least one first coupling piece for coupling the printed circuit board and the shield member to each other, and the shield member may include a through-hole formed therein to allow the first coupling piece to be inserted thereinto.

The second casing may be formed of a plastic material, and the shield member may be grounded to the second casing.

The printed circuit board may include an image sensor disposed on a surface that faces the lens unit so as to be spaced apart from the lens unit in a first direction that is parallel to the optical-axis direction of the lens unit, and a first connector provided on a surface that is opposite the surface on which the image sensor is disposed so as to be electrically connected with an external power source.

The second casing may accommodate a second connector therein, and the second connector may electrically connect the external power source and the first connector to each other.

The camera module may further include a third connector configured to electrically connect the external power source and the second connector to each other.

The camera module may further include a first packing member inserted into a hollow region formed in the first casing and configured to pack a coupling portion of the lens unit and the first casing.

The camera module may further include a second packing member interposed between the first casing and the second casing and configured to pack a coupling portion of the first casing and the second casing.

The camera module may further include at least one second coupling piece for coupling the first casing and the second casing to each other.

In another embodiment, a camera module includes a lens unit including a barrel formed of a metal material and including a hollow region formed therein to allow incident light to pass therethrough and at least one lens mounted to the barrel, a first casing coupled with the lens unit, a printed circuit board disposed behind the lens unit so as to be spaced apart from the lens unit and to face the lens unit in an optical-axis direction of the lens unit, a second casing formed of a plastic material, the second casing being disposed behind the first casing so as to be coupled at a front portion thereof to a rear portion of the first casing and being configured to accommodate the printed circuit board therein, and a shield member electrically connected to the barrel and grounded to the second casing.

The shield member may prevent static electricity from flowing to the printed circuit board accommodated in the second casing by allowing static electricity generated at the barrel to flow to the second casing.

Advantageous Effects

In the embodiment, the shield member shields static electricity, which is generated at the barrel, thereby preventing the static electricity from flowing to the printed circuit board.

Therefore, since the shield member prevents static electricity from flowing to the printed circuit board, it is possible to prevent performance degradation or breakdown of the image sensor or other components of the printed circuit board attributable to static electricity.

In addition, it is possible to prevent the quality of an image captured by the camera module from being degraded due to malfunction of the image sensor attributable to static electricity flowing through the image sensor.

BEST MODE

Hereinafter, embodiments will be described in detail with reference to the accompanying drawings. While the disclosure is susceptible to various modifications and alternative forms, specific embodiments thereof are shown by way of example in the drawings and are explained in detail in the description. However, the disclosure should not be construed as being limited to the embodiments set forth herein, but on the contrary, the disclosure is intended to cover all modifications, equivalents, and alternatives falling within the spirit and scope of the embodiments. In the drawings, the sizes and shapes of elements may be exaggerated for convenience and clarity of description.

It may be understood that, although the terms "first," "second," etc. may be used herein to describe various elements, these elements should not be limited by these terms. These terms are generally only used to distinguish one element from another. In addition, terms particularly defined in consideration of construction and operation of the embodiments are used only to describe the embodiments, but do not define the scope of the embodiments.

It will be understood that when an element is referred to as being "on" or "under" another element, it can be directly on/under the element, or one or more intervening elements may also be present. When an element is referred to as being "on" or "under", "under the element" as well as "on the element" can be included based on the element.

In addition, relational terms, such as "on/upper part/above" and "under/lower part/below," are used only to distinguish between one subject or element and another subject or element without necessarily requiring or involving any physical or logical relationship or sequence between such subjects or elements.

In addition, an orthogonal coordinate system (x, y, z) may be used in the drawings. In each drawing, the x-axis and the y-axis are perpendicular to an optical-axis direction, and for convenience, the optical-axis direction (the z-axis direction) may be referred to as a first direction, the x-axis direction may be referred to as a second direction, and the y-axis direction may be referred to as a third direction.

Figure 1:
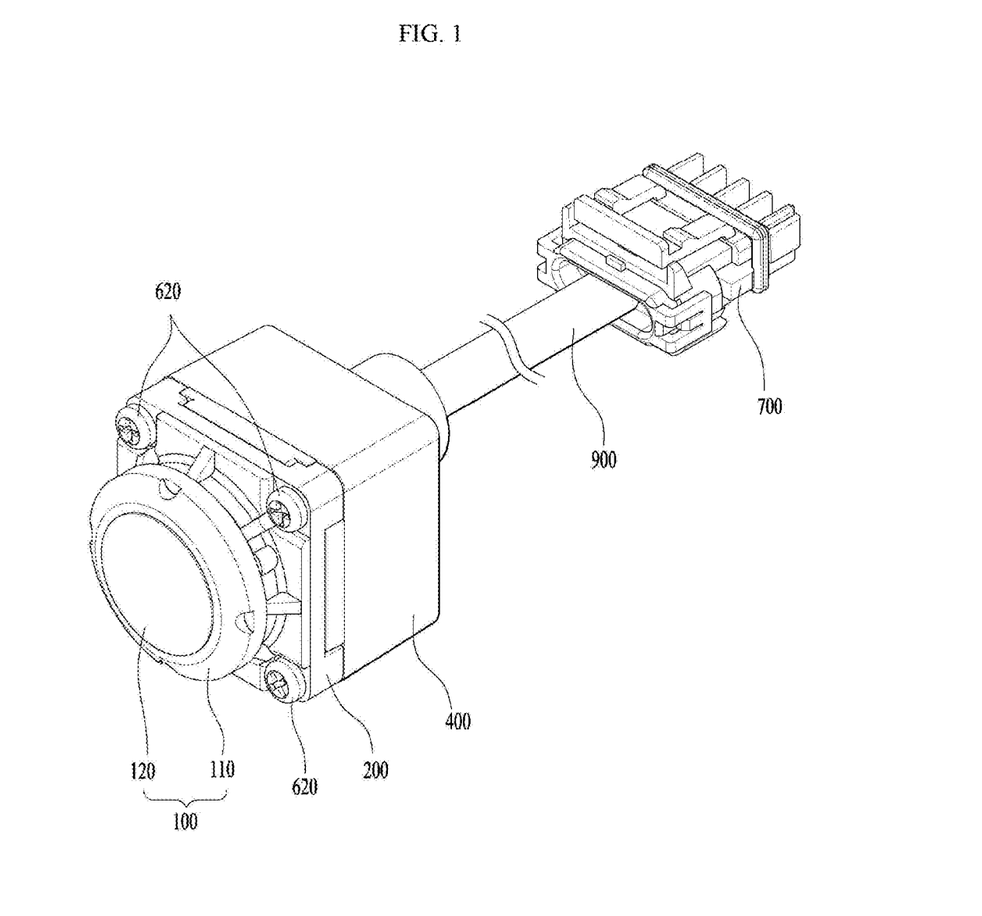
FIG. 1 is an exploded perspective view illustrating a camera module according to an embodiment.
Figure 2:
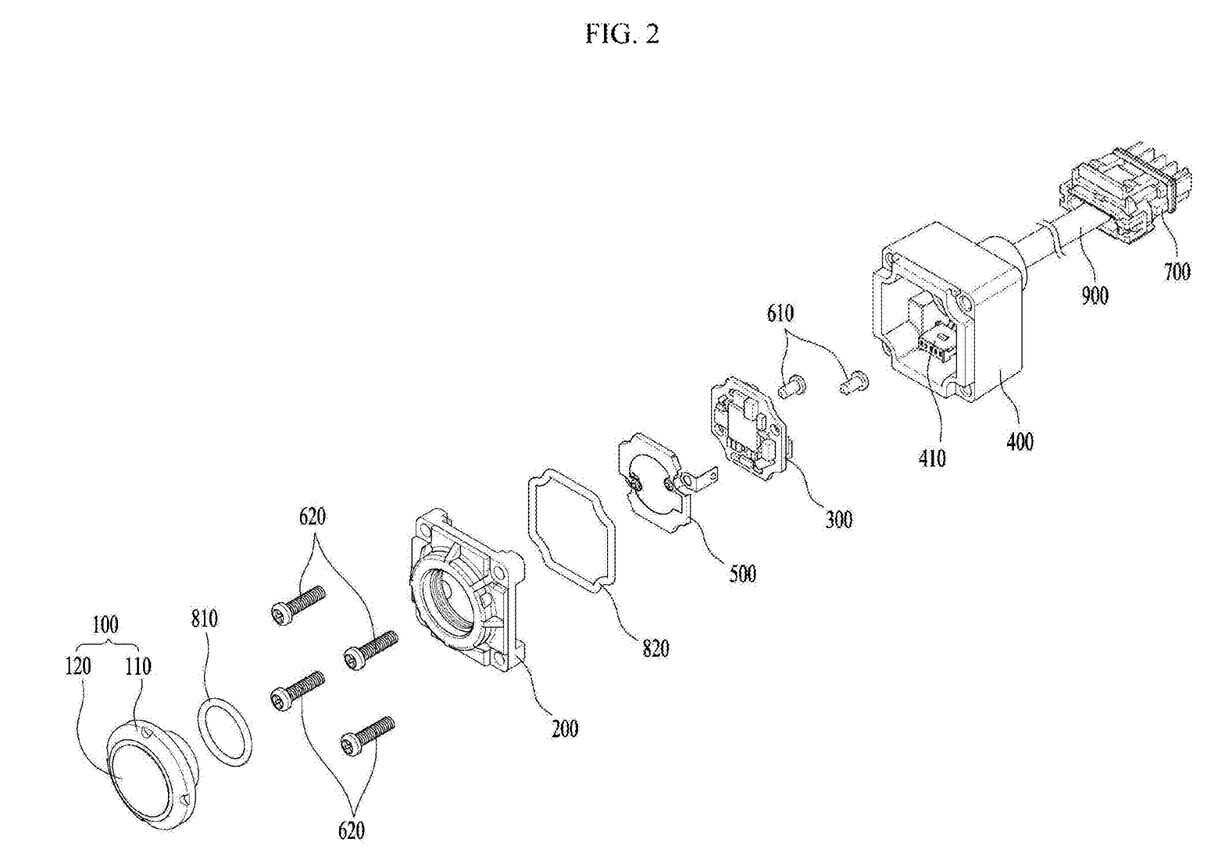
FIG. 2 is a perspective view illustrating the camera module according to the embodiment.
Figure 3:
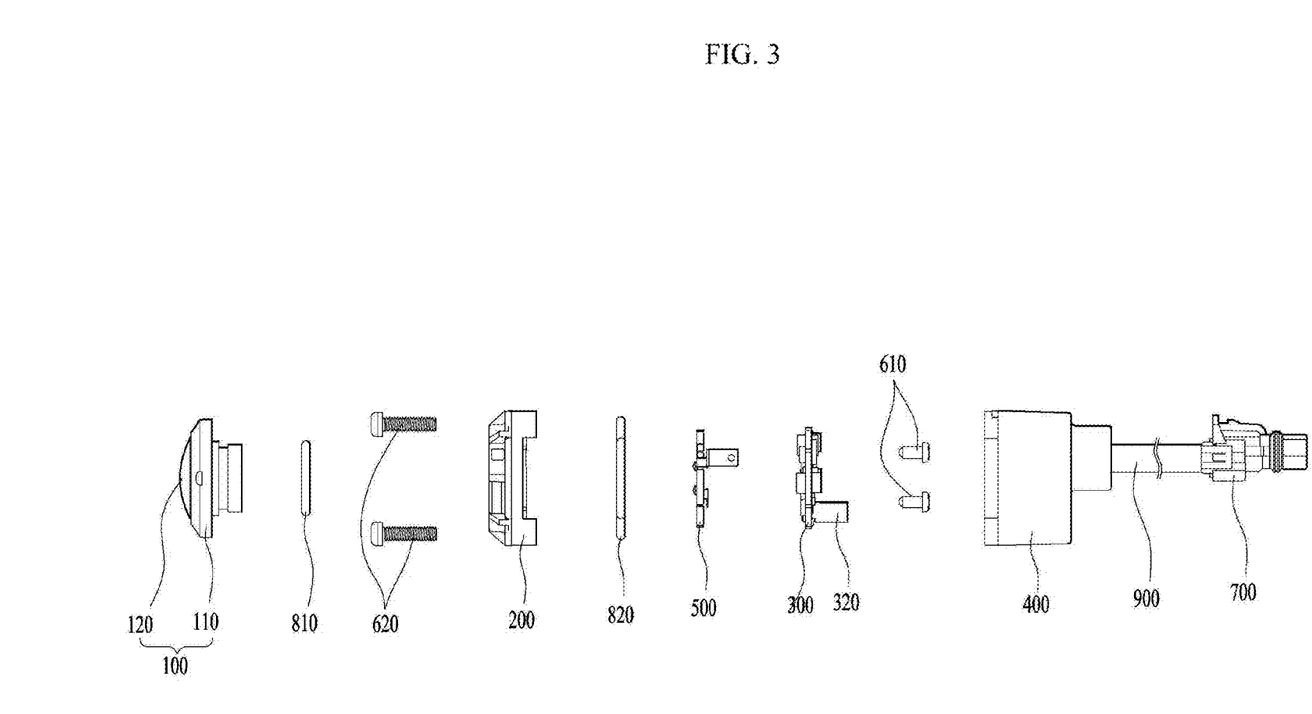
FIG. 3 is a side view illustrating the camera module according to the embodiment.

FIG. 1 is an exploded perspective view illustrating a camera module according to an embodiment. FIG. 2 is a perspective view illustrating the camera module according to the embodiment. FIG. 3 is a side view illustrating the camera module according to the embodiment.

A camera module may include a lens unit 100, a first casing 200, a printed circuit board 300, a second casing 400, a shield member, a first coupling piece 610, a second coupling piece 620, a third connector 700, a first packing member 810, a second packing member 820, and a cable 900.

The lens unit 100 is a component on which external light is incident, and may be coupled to the first casing 200, and may include a barrel 110 and a lens 120. The barrel 110 may be configured such that a hollow region, through which the incident light passes, is formed therein and such that the rear portion thereof is inserted into a hollow region formed in the first casing 200.

The lens 120 may be mounted to the barrel 110. The barrel 110 may be provided with at least one lens. The lens 120 may be one in number. However, a plurality of lenses 120 may be arranged in the axial direction of the light incident on the camera module so as to form an optical system.

Here, in order to protect the lens 120, which is mounted to the barrel 110, from external shocks, the barrel 110 may be formed of a metal material having sufficient strength and hardness. Because the barrel 110 is exposed to the outside, electrostatic discharge (ESD) may occur due to the influence of foreign substances, such as dust particles or the like, present in the air.

Static electricity may be generated at the barrel 110 by the ESD, and may flow to the printed circuit board 300, which is disposed behind the barrel 110. If static electricity flows to the printed circuit board 300, it may have a negative influence on an image sensor 310 and other components, which are provided at the printed circuit board 300, and thus may cause performance degradation or breakdown of the camera module.

Therefore, in the embodiment, there may be provided the shield member 500 for shielding static electricity so as to prevent static electricity generated at the barrel 110 from flowing to the printed circuit board 300. A detailed description of the shield member 500 will be made later with reference to the drawings.

The first casing 200 is a component to which the lens unit 100 is coupled. The first casing 200 may define therein a hollow region, and the rear portion of the barrel 110 may be inserted into and coupled to the hollow region in the first casing 200.

Here, the coupling structure of the first casing 200 and the barrel 110 is as follows. For example, screw threads are formed in the inner peripheral surface of the hollow region in the first casing 200, and screw threads are formed in the rear portion of the barrel 110 so as to correspond to the screw threads in the first casing 200, whereby the first casing 200 and the barrel 110 are coupled to each other in a screw-engagement manner.

In another embodiment, the first casing 200 and the barrel 110 may be coupled to each other in an adhesive manner by applying an adhesive agent to the inner peripheral surface of the hollow region in the first casing 200 and/or the outer peripheral surface of the barrel 110.

The printed circuit board 300 may be disposed behind the lens unit 100 so as to be spaced apart from the lens unit 100. The printed circuit board 300 may be disposed so as to face the lens unit 100 in the optical-axis direction of the lens unit 100. The printed circuit board 300 may include the image sensor 310, at which light incident on the lens 120 arrives and on which an image is formed. A detailed description of the printed circuit board 300 will be made later with reference to FIG. 5.

Figure 4:
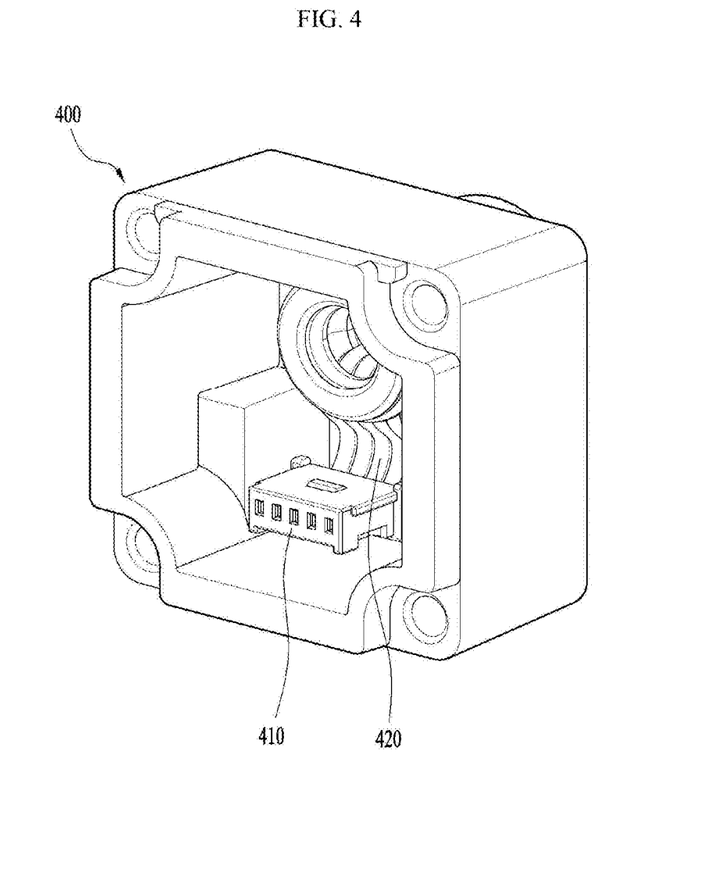
FIG. 4 is a perspective view illustrating a second casing according to the embodiment.

The second casing 400 may be disposed behind the first casing 200, may accommodate the printed circuit board 300 therein, and may be coupled at the front portion thereof to the rear portion of the first casing 200. Here, the first casing 200 and the second casing 400 may be coupled to each other using, for example, the second coupling piece 620.

In another embodiment, the first casing 200 and the second casing 400 may be coupled to each other via shape fitting or interference fitting without a separate coupling piece, or may be coupled to each other using an adhesive agent. A detailed description of the second casing 400 will be made later with reference to FIG. 4.

The shield member 500 may be disposed between the lens unit 100 and the printed circuit board 300. The shield member 500 may be electrically connected to the lens unit 100, specifically, to the barrel 110, and may be grounded to the second casing 400.

Therefore, the shield member 500 prevents static electricity generated at the barrel 110, which is made of a metal material, from flowing to the printed circuit board 300, thereby preventing performance deterioration or breakdown of the printed circuit board 300 attributable to static electricity. A detailed description of the shield member 500 will be made later with reference to FIGS. 6 and 7.

The first coupling piece 610 may serve to couple the printed circuit board 300 and the shield member 500 to each other, and may include at least one coupling piece. As shown in FIGS. 2 and 3, in the embodiment, two first coupling pieces 610 are arranged symmetrical to each other with respect to the printed circuit board 300.

However, the disclosure is not limited to this configuration. One first coupling piece 610 may be used, or three or more first coupling pieces 610 may be used. Here, the first coupling piece 610 may be embodied by, for example, a screw, a bolt, a coupling pin, or some other appropriate coupling mechanism.

Further, the printed circuit board 300 and the shield member 500 may have therein holes into which the first coupling pieces 610 are inserted, and the holes formed in each of the printed circuit board 300 and the shield member 500 may be the same in number as the first coupling pieces 610.

The second coupling piece 620 may serve to couple the first casing 200 and the second casing 400 to each other, and may include at least one coupling piece. As shown in FIGS. 2 and 3, in the embodiment, four second coupling pieces 620 are arranged symmetrical to each other with respect to the first casing 200 and the second casing 400.

However, the disclosure is not limited to this configuration. The number and locations of the second coupling pieces 620 may be appropriately selected in consideration of the overall structure of the camera module. Here, the second coupling piece 620 may be embodied by, for example, a screw, a bolt, a coupling pin, or some other appropriate coupling mechanism.

In addition, the first casing 200 and the second casing 400 may have therein holes or recesses into which the second coupling pieces 620 are inserted, and the holes or the recesses formed in each of the first casing 200 and the second casing 400 may be the same in number and arrangement location as the second coupling pieces 620.

The third connector 700 may serve to electrically connect an external power source (not shown) and a second connector 410. That is, the third connector 700 may be connected with the external power source, the cable 900 may be connected to the third connector 700, and the cable 900 may be connected to the second connector 410, which is accommodated in the second casing 400.

In addition, the second connector 410 may be connected with a first connector 320, which is provided at the printed circuit board 300. Through this configuration, power may be applied from the external power source to the printed circuit board 300.

In addition, the third connector 700 may be additionally connected with external devices other than the external power source. Accordingly, the printed circuit board 300 may receive control signals or the like from the external devices. In addition, a signal related to a captured image or the like may be transmitted from the printed circuit board 300 to the external devices.

The first packing member 810 may be inserted into the hollow region formed in the first casing 200, and may serve to pack the coupling portion of the lens unit 100 and the first casing 200. Here, the first packing member 810 may be embodied by, for example, an O-ring.

Therefore, the first packing member 810 may prevent the introduction of external foreign substances, or may greatly reduce the amount of foreign substances introduced to the interior of the camera module through the coupling portion of the lens unit 100 and the first casing 200.

The second packing member 820 may be interposed between the first casing 200 and the second casing 400, and may serve to pack the coupling portion of the first casing 200 and the second casing 400.

Therefore, the second packing member 820 may prevent the introduction of external foreign substances, or may greatly reduce the amount of foreign substances introduced to the interior of the camera module through the coupling portion of the first casing 200 and the second casing 400.

The cable 900 may serve to interconnect the second connector 410 and the third connector 700. Therefore, one end of the cable 900 may be connected to the second connector 410, and the opposite end of the cable 900 may be connected to the third connector 700.

The cable 900 may include a plurality of electrically conductive wires, each of which is coated with protective insulation. Further, some of the wires may be used to supply power from the external power source to the printed circuit board 300.

Further, the remaining wires may be used to transmit a control signal, a signal related to a captured image, and the like between the printed circuit board 300 and the external devices other than the external power source.

FIG. 4 is a perspective view illustrating the second casing 400 according to the embodiment. As described above, the printed circuit board 300 may be accommodated in the second casing 400. In addition, the second connector 410 may be accommodated in the second casing 400.

The second connector 410 may be configured to be connected with one end of the cable 900 and to be coupled with the first connector 320. Therefore, the second connector 410 may serve to electrically connect the first connector 320 to the external power source and the external devices.

Further, as shown in FIG. 4, the second casing 400 may have therein recesses into which the second coupling pieces 620 are inserted. Furthermore, the second casing 400 may include a protruding portion formed at the front end thereof in order to enhance the packing effect via contact with the second packing member, and the protruding portion may be formed to have a shape that corresponds to the shape of the second packing member.

Figure 5:
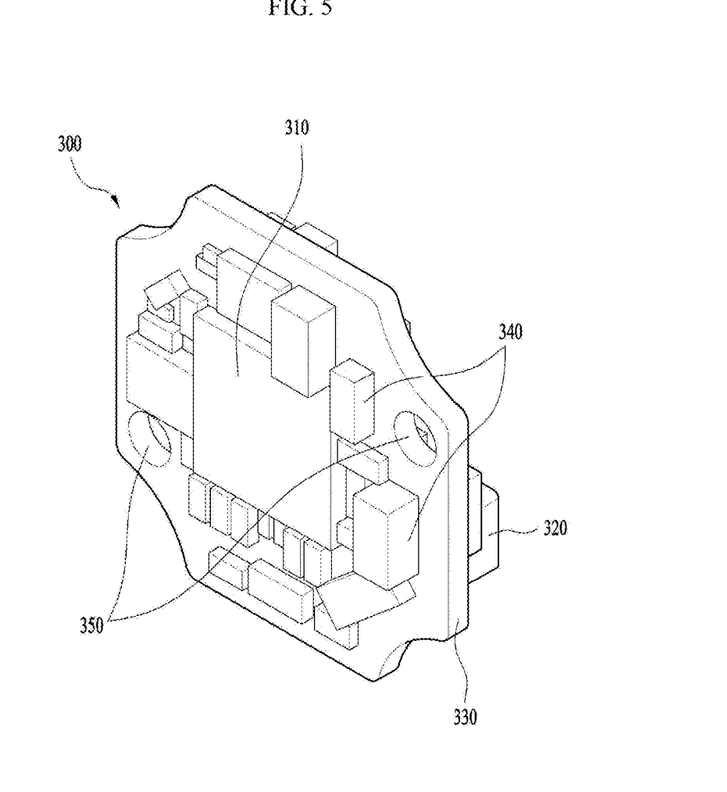
FIG. 5 is a perspective view illustrating a printed circuit board according to the embodiment.

FIG. 5 is a perspective view illustrating the printed circuit board 300 according to the embodiment. The printed circuit board 300 may include the image sensor 310, the first connector 320, a base substrate 330, elements 340, and through-holes 350.

The base substrate 330 may be formed in a plate shape, may include a plurality of circuits printed on both surfaces thereof, and may further include the image sensor 310, the first connector 320, and the elements 340.

The image sensor 310 may be disposed on the surface of the printed circuit board 330 that faces the lens unit 100 so as to be spaced apart from the lens unit 100 in a first direction, which is parallel to the optical-axis direction of the lens unit 100.

Therefore, as shown in FIG. 5, the image sensor 310 may be disposed on the front surface of the printed circuit board 300, which faces the lens unit 100, and may serve as a component on which the light having passed through the lens unit 100 is incident and at which an image is formed. A signal related to the image formed at the image sensor 310 may be transmitted to the external devices, which are electrically connected to the image sensor 310.

The first connector 320 may be provided on the surface that is opposite the surface on which the image sensor 310 is disposed so as to be electrically connected with the external power source. As shown in FIG. 5, the first connector 320 may be disposed on the surface of the printed circuit board 300 that is opposite the surface on which the image sensor 310 is disposed, i.e. on the rear surface of the printed circuit board 300.

As described above, the first connector 320 may be coupled and connected to the second connector 410. Therefore, the printed circuit board 300 may be connected with the external power source via the first connector 320, the second connector 410, the third connector 700 and the cable 900, and may be additionally connected to external devices other than the external power source.

The elements 340 may be provided on both surfaces of the printed circuit board 300, and may serve to transmit a signal related to the image formed at the image sensor 310, to receive power supplied from the external power source and to rectify the same, to receive control signals from the external devices, or to operate the image sensor 310 and the printed circuit board 300 including the same.

The through-holes 350 are portions into which the first coupling pieces 610 are inserted to couple the printed circuit board 300 and the shield member 500 to each other. As shown in FIG. 5, in the embodiment, because two first coupling pieces 610 are provided symmetrical to each other with respect to the printed circuit board 300, the through-holes 350 are formed in the printed circuit board 300 so as to correspond to the first coupling pieces 610 in terms of location, shape and number.

Figure 6:
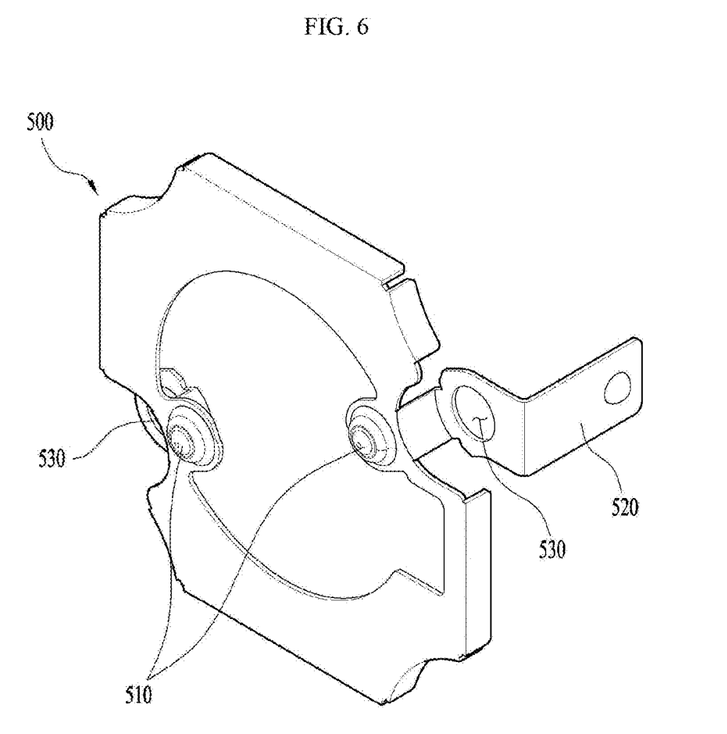
FIG. 6 is a perspective view illustrating a shield member according to the embodiment.
Figure 7:
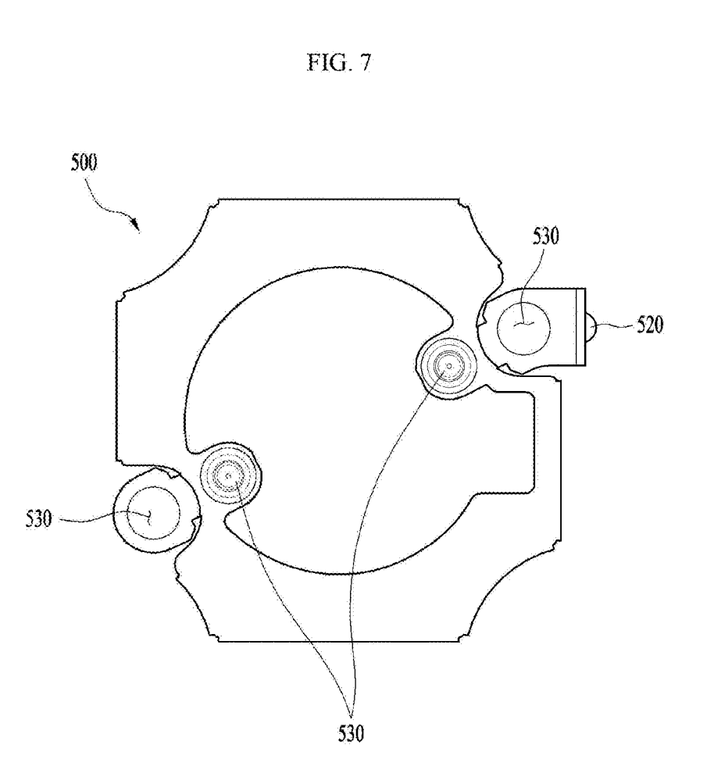
FIG. 7 is a front view illustrating the shield member according to the embodiment.

FIG. 6 is a perspective view illustrating the shield member 500 according to the embodiment. FIG. 7 is a front view illustrating the shield member 500 according to the embodiment. The shield member 500 may be electrically connected to the barrel 110, which is formed of a metal material.

Further, the second casing 400 may be formed of a non-metal material, for example, a plastic material, and the shield member 500 may be grounded to the second casing 400.

Through this configuration, the shield member 500 allows static electricity, which is generated at the barrel 110, to flow to the second casing 400, thereby preventing static electricity from flowing to the printed circuit board 300 accommodated in the second casing.

The shield member 500 may be formed of a metal material, and may define therein a hollow region. Since the shield member 500 is formed of a metal material, static electricity, which is generated at the barrel 110, which is formed of a metal material and is electrically connected with the shield member 500, may flow to the shield member 500.

The hollow region formed in the shield member 500 may be disposed in the optical-axis direction of the lens unit 100. Therefore, the light having passed through the lens unit 100 may be incident on the image sensor 310, which is provided at a position that faces the lens unit 100, without being interrupted by the shield member 500.

In addition, the shield member 500 may include a first terminal 510, a second terminal 520, and through-holes 530. The through-holes 530 are portions into which the first coupling pieces 610 for coupling the shield member 500 and the printed circuit board 300 to each other are inserted.

As shown in FIGS. 6 and 7, in the embodiment, because two first coupling pieces 610 are provided symmetrical to each other with respect to the shield member 500, the through-holes 530 are formed in the shield member 500 so as to correspond to the first coupling pieces 610 in terms of location, shape and number.

The first terminal 510 may protrude in the central direction of the hollow region so as to be brought into contact with the barrel 110, and may serve to electrically connect the shield member 500 to the barrel 110.

The first terminal 510 may be brought into contact with an end portion of the region of the barrel 110 that faces the printed circuit board 300, i.e. with the rear end of the barrel 110, and thus the barrel 110 and the shield member 500 may be electrically connected to each other.

The second terminal 520 may be bent and extend from the shield member 500 so as to be brought into contact with the second casing 400, and may serve to allow the shield member 500 to be grounded to the second casing 400. As shown in FIG. 6, the second terminal 520 may be bent and extend from the shield member 500 in the backward direction of the lens unit 100, and may be brought into contact with the second casing 400.

Since the second terminal 520 is formed of a metal material and the second casing 400 is formed of a non-metal material, for example, a plastic material, the second casing 400 may ground the static electricity flowing through the shield member 500.

The static electricity, which is generated at the barrel 110, flows to the shield member 500, which is electrically connected with the barrel 110 via the first terminal 510. In addition, the static electricity flowing through the shield member 500 may be eliminated by being discharged to the second casing 400, which is in contact with the second terminal 520.

Through this configuration, the static electricity generated at the barrel 110 flows to the shield member 500, and the static electricity flowing through the shield member 500 is eliminated by being discharged to the second casing 400. Therefore, the static electricity generated at the barrel 110 is prevented from flowing to the printed circuit board 300.

In the embodiment, the shield member 500 shields static electricity, which is generated at the barrel 110, thereby preventing the static electricity from flowing to the printed circuit board 300.

Therefore, since the shield member 500 prevents static electricity from flowing to the printed circuit board 300, it is possible to prevent performance degradation or breakdown of the image sensor 310 or other components of the printed circuit board 300 attributable to static electricity.

In addition, it is possible to prevent the quality of an image captured by the camera module from being degraded due to malfunction of the image sensor 310 attributable to static electricity flowing through the image sensor 310.

Although only a limited number of embodiments have been described above, various other embodiments are possible. The technical contents of the above-described embodiments may be combined into various forms as long as they are not incompatible with one another, and thus may be implemented in new embodiments.

INDUSTRIAL APPLICABILITY

In the embodiments, the shield member shields static electricity generated at the barrel, and accordingly static electricity does not flow to the printed circuit board. Therefore, the embodiments have industrial applicability.

The invention claimed is:
1. A camera module comprising:
a lens unit;
a first casing coupled with the lens unit;
a printed circuit board disposed behind the lens unit so as to be spaced apart from the lens unit and to face the lens unit in an optical-axis direction of the lens unit;
a second casing disposed behind the first casing and coupled at a front portion thereof to a rear portion of the first casing, the second casing being configured to accommodate the printed circuit board therein; and
a shield member electrically connected to the lens unit and grounded to the second casing,
wherein the shield member is disposed between the lens unit and the printed circuit board, and
wherein the shield member comprises:
an upper surface to which an optical axis of the camera module is perpendicular;
a hollow region within the upper surface;
a first terminal protruding from the upper surface in a radial direction into the hollow region; and
a second terminal that comprises a first portion bent from the upper surface and extending downwardly therefrom, a second portion bent from the first portion and extending laterally therefrom, and a third portion bent from the second portion and extending downwardly therefrom, wherein the third portion of the second terminal is configured so as to be brought into contact with the second casing and to allow the shield member to be grounded to the second casing.

2. The camera module according to claim 1, wherein the lens unit comprises:
a barrel comprising a hollow region formed therein to allow incident light to pass therethrough and inserted at a rear portion thereof into a hollow region formed in the first casing; and
at least one lens mounted to the barrel.

3. The camera module according to claim 2, wherein the barrel is formed of a metal material, and the shield member is electrically connected to the barrel.

4. The camera module according to claim 3, wherein the shield member is formed of a metal material.

5. The camera module according to claim 4, comprising:
at least one first coupling piece that couples the printed circuit board and the shield member to each other.

6. The camera module according to claim 5, wherein the second portion of the second terminal of the shield member comprises a through-hole formed therein to allow the first coupling piece to be inserted thereinto.

7. The camera module according to claim 2, wherein the second casing is formed of a plastic material.

8. The camera module according to claim 7, wherein the shield member is grounded to the second casing.

9. The camera module according to claim 1, wherein the printed circuit board comprises:
an image sensor disposed on a surface that faces the lens unit so as to be spaced apart from the lens unit in a first direction that is parallel to the optical-axis direction of the lens unit; and
a first connector provided on a surface that is opposite the surface on which the image sensor is disposed so as to be electrically connected with an external power source.

10. The camera module according to claim 9, wherein the second casing accommodates a second connector therein, the second connector being configured to electrically connect the external power source and the first connector to each other.

11. The camera module according to claim 10, comprising:
a third connector configured to electrically connect the external power source and the second connector to each other.

12. The camera module according to claim 1, comprising:
a first packing member inserted into a hollow region formed in the first casing and configured to pack a coupling portion of the lens unit and the first casing.

13. The camera module according to claim 1, comprising:
a second packing member interposed between the first casing and the second casing and configured to pack a coupling portion of the first casing and the second casing.

14. The camera module according to claim 1, comprising:
at least one second coupling piece for coupling the first casing and the second casing to each other.

15. A camera module comprising:
a lens unit comprising a barrel formed of a metal material and comprising a hollow region formed therein to allow incident light to pass therethrough, and at least one lens mounted to the barrel;
a first casing coupled with the lens unit;
a printed circuit board disposed behind the lens unit so as to be spaced apart from the lens unit and to face the lens unit in an optical-axis direction of the lens unit;
a second casing formed of a plastic material, the second casing being disposed behind the first casing so as to be coupled at a front portion thereof to a rear portion of the first casing and being configured to accommodate the printed circuit board therein; and
a shield member electrically connected to the barrel and grounded to the second casing,
wherein the shield member is disposed between the barrel of the lens unit and the printed circuit board, and
wherein the shield member comprises:
an upper surface to which an optical axis of the camera module is perpendicular;
a hollow region within the upper surface;
a first terminal protruding from the upper surface in a radial direction into the hollow region so as to be brought into contact with the barrel and configured to electrically connect the barrel and the shield member to each other; and
a second terminal that comprises a first portion bent from the upper surface and extending downwardly therefrom, a second portion bent from the first portion and extending laterally therefrom, and a third portion bent from the second portion and extending downwardly therefrom, wherein the third portion of the second terminal is configured so as to be brought into contact with the second casing and to allow the shield member to be grounded to the second casing.

16. The camera module according to claim 15, wherein the shield member inhibits static electricity from flowing to the printed circuit board accommodated in the second casing by allowing static electricity generated at the barrel to flow to the second casing.

17. The camera module according to claim 15, wherein the shield member is formed of a metal material.

18. The camera module according to claim 17, comprising:
at least one first coupling piece that couples the printed circuit board and the shield member to each other.

19. A camera module comprising:
a lens unit comprising a barrel formed of a metal material and comprising a hollow region formed therein to allow incident light to pass therethrough, and at least one lens mounted to the barrel;
a first casing coupled with the lens unit;
a printed circuit board disposed behind the lens unit so as to be spaced apart from the lens unit and to face the lens unit in an optical-axis direction of the lens unit;
a second casing formed of a plastic material, the second casing being disposed behind the first casing so as to be coupled at a front portion thereof to a rear portion of the first casing and being configured to accommodate the printed circuit board therein;
a shield member electrically connected to the barrel and grounded to the second casing; and
at least one first coupling piece that couples the printed circuit board and the shield member to each other,
wherein the shield member is disposed between the barrel of the lens unit and the printed circuit board,
wherein the printed circuit board comprises:
an image sensor disposed on a surface that faces the lens unit so as to be spaced apart from the lens unit in a first direction that is parallel to the optical-axis direction of the lens unit; and
a first connector provided on a surface that is opposite the surface on which the image sensor is disposed so as to be electrically connected with an external power source;
wherein the shield member comprises:
an upper surface to which an optical axis of the camera module is perpendicular;
a hollow region within the upper surface;
a first terminal protruding from the upper surface in a radial direction into the hollow region so as to be brought into contact with the barrel and configured to electrically connect the barrel and the shield member to each other; and
a second terminal that comprises a first portion bent from the upper surface and extending downwardly therefrom, a second portion bent from the first portion and extending laterally therefrom, and a third portion bent from the second portion and extending downwardly therefrom, wherein the third portion of the second terminal is configured so as to be brought into contact with the second casing and to allow the shield member to be grounded to the second casing, and
wherein the second portion of the second terminal of the shield member comprises a through hole to allow the first coupling piece to be inserted thereinto.

20. The camera module according to claim 18, wherein the second portion of the second terminal of the shield member comprises a through hole to allow the first coupling piece to be inserted thereinto.

* * * * *